United States Patent [19]

White et al.

[11] 4,212,269

[45] Jul. 15, 1980

[54] POULTRY CAGES

[75] Inventors: Charles A. White, Holland; W. Ronald Williams, Saginaw, both of Mich.

[73] Assignee: U. S. Industries, Inc., New York, N.Y.

[21] Appl. No.: 871,821

[22] Filed: Jan. 24, 1978

[51] Int. Cl.² ............................................. A01K 31/06
[52] U.S. Cl. ........................................ 119/17; 119/48
[58] Field of Search ...................... 119/15, 17, 18, 22, 119/48; 248/207, 215

[56] References Cited

U.S. PATENT DOCUMENTS

| | | | |
|---|---|---|---|
| 2,105,058 | 1/1938 | Smith et al. | 119/48 |
| 3,311,087 | 3/1967 | Graves | 119/48 X |
| 3,545,406 | 12/1970 | Osborn | 119/17 |
| 3,757,741 | 9/1973 | Siciliano | 119/17 |
| 4,060,055 | 11/1977 | Skinner | 119/48 |

FOREIGN PATENT DOCUMENTS

2108518 9/1972 Fed. Rep. of Germany ............ 119/22
946507 1/1964 United Kingdom ...................... 119/22

*Primary Examiner*—Louis G. Mancene
*Assistant Examiner*—Robert P. Swiatek

*Attorney, Agent, or Firm*—Price, Heneveld, Huizenga & Cooper

[57] ABSTRACT

An array of vertically spaced rows of poultry cages are mounted on opposite sides of A-frame end supports with the uppermost rows engaging and secured to one another along a corner to provide additional stability to the frame. Load transferring hooks are coupled between vertically spaced cages to provide support for the inwardly projecting ends of the cages while the cages at opposite ends of the subassembly are mounted to the legs of the A-frame by brackets. Longitudinally formed struts extend and are coupled along the top edge of each row of cages for providing longitudinal strength to the cages while simultaneously compressively gripping a manure shield draped over a rear inclined surface of each of the cages. Improved integrally formed tab means are formed in a support bracket at the end of each row of cages for interlocking subassemblies in an installation. In some embodiments, improved doors are provided with outwardly projecting handles and U-shaped floor support hooks extend under the floor and attach to the forward wall of each of the cages. In other embodiments, improved feed tray holding clamps are employed with each cage to securely hold the feed tray in a predetermined relationship.

14 Claims, 8 Drawing Figures

POULTRY CAGES

BACKGROUND OF THE INVENTION

The present invention relates to improvements in poultry cages.

The raising of poultry within confinement cages for egg-production purposes has become the predominant system in this and other countries. The principal reason for this is the many operating advantages and efficiencies realized from such systems.

With the advent of spiraling costs for building, land, and materials, continued efforts are made to reduce the amount of material and expense for each confinement cage as well as seeking new ways for increasing the number of poultry which can be raised or kept in a given floor space. Recently, it has been acknowledged that more efficient production per hen can be realized by providing cages having a greater width and a shallower depth such that the hens can all simultaneously have access to a feeding trough extending along the front of the cages. By providing multi-levels of confinement cages including watering, feeding, egg collecting, manure collecting, and general servicing of the cages, the structure of such multi-tiered cages has become increasingly complex resulting in arrangements which can increase rather than reduce the overall cost per hen even though a reduction in floor space and an increase in output has been achieved.

Thus, there exists a need for a multi-tiered cage system which increases the density of confined poultry with regards to floor space while at the same time providing a structurally rigid subassembly which can be coupled to other subassemblies to provide an installation which significantly reduces the overall cost involved per hen.

SUMMARY OF THE INVENTION

In accordance with the present invention, a plurality of vertically spaced rows of poultry cages are mounted on opposite sides and between A-frame supports with two rows of cages on the opposite sides coming in contact along a corner of the cages extending longitudinally along the length of the assembly. The corners of the cages are secured to one another for adding additional strength to the framework.

According to another aspect of the present invention, hanger means are provided which extend between vertically spaced cages for supporting the inwardly extending rear ends of the cages of the assembly.

According to a further aspect of the present invention, longitudinally extending struts are coupled along an upper rear corner of each of the rows of cages and are secured thereto for providing strength to the cage assembly and at the same time compressively hold a manure shield draped downwardly over the rear surfaces of the lower cages.

According to a further aspect of the present invention, improved floor support hangers including a U-shaped hook extends under the floor of each cage and attaches to the forward wall of the cage. Also, a sliding wire door assembly is provided with an outwardly projecting upper lip defining a handle permitting easier operation of the door. Also, improved tray holding clamps are provided for securing a longitudinally extending feed tray along the front of each of the cages at each row.

These and other features, advantages, and objects of the present invention will become apparent upon reading the following description thereof together with the drawings in which:

DETAILED DESCRIPTION OF THE PREFERRED EMBODIMENT

Figure 1:
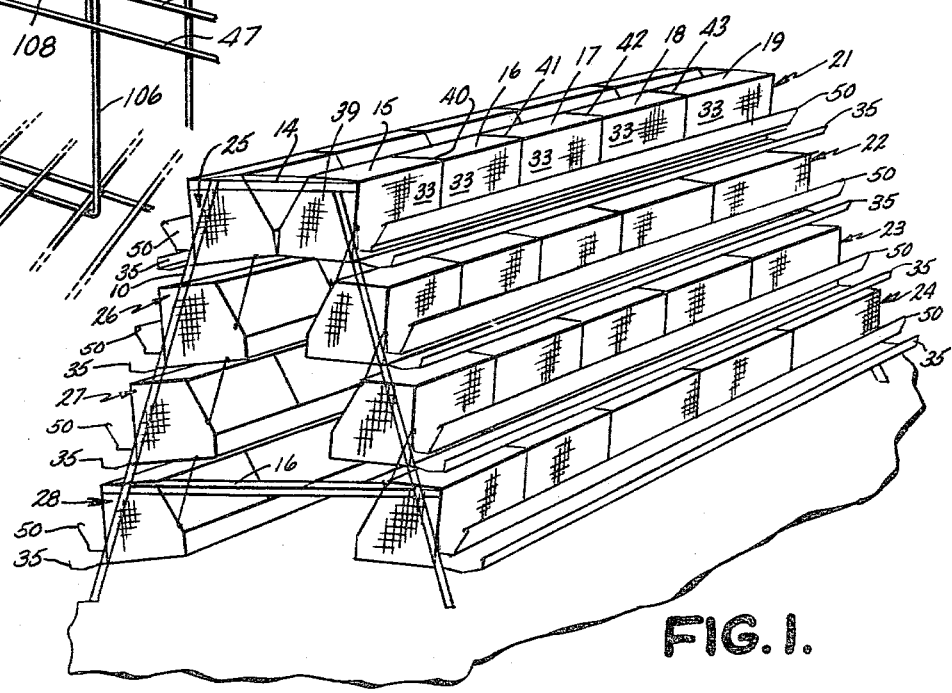
FIG. 1 is a perspective schematic view of a multi-tiered cage subassembly constructed according to the present invention.
Figures 2, 3, 6:
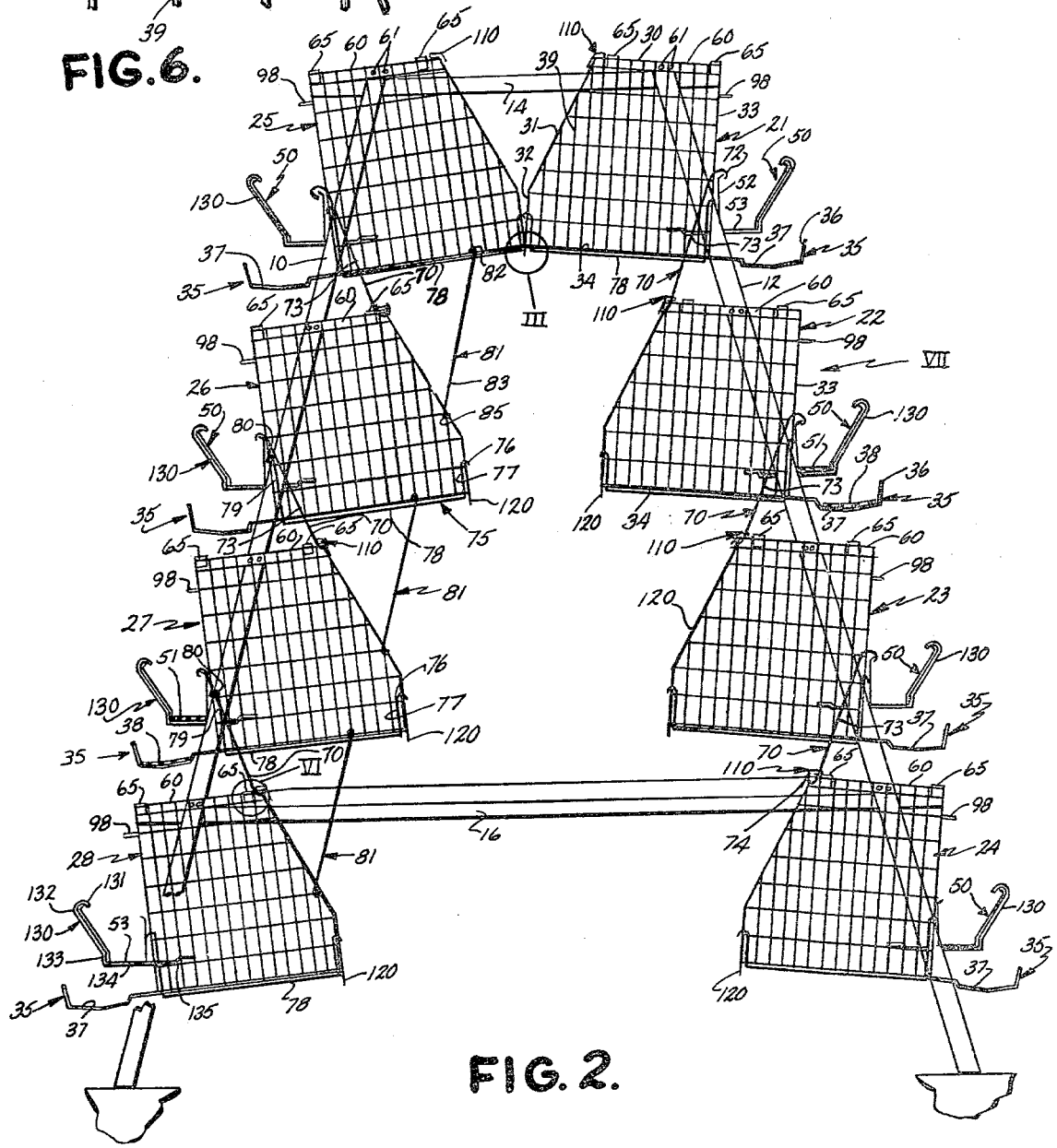
FIG. 2 is an enlarged end elevational view partly broken away of the structure shown in FIG. 1.
FIG. 3 is a fragmentary enlarged view of a portion of the structure shown in FIG. 2.
FIG. 6 is an enlarged fragmentary perspective view of one of the mounting brackets as shown in FIG. 2.

Referring now to FIGS. 1 and 2, there is shown a multiple tier poultry cage assembly comprising end A-frames between which there longitudinally extends integral cages made of wire mesh. In the embodiment shown in FIGS. 1 and 2, each of the end A-frames includes a first leg 10 and a second leg 12 extending from the floor support upwardly and converging inwardly and joined at the top end by means of an upper cross support 14. Near the bottom of legs 10 and 12 there is provided a lower cross support 16. The frame members are made of suitable galvanized channel members conventionally secured to the cross supports by means of bolts. A wire truss (not shown) extends between cross supports 14 and preferably is deflected downwardly and attached to the rear of the uppermost row of cages. Each of the end frames are identical and comprise the only separate frame members for the assembly, the remaining support being accomplished by the unique cage construction and their mounting.

Between the end frames there extends eight integral cage assemblies 21 through 28 each of them constituting a row of five cages having a width of 24 inches in a longitudinal direction, a depth of 14 inches extending rearwardly from the support legs inwardly toward cages on the opposite side, and a height of 14 inches. The row 21 thus, for example, includes cages 15 through 19.

Each row of cages is manufactured from two sections of elongated galvanized wire mesh extending the length of the unit. The first section of mesh integrally forms, as best seen in FIG. 2, an inclined rear wall 31, a rear wall 32, and a floor 34 which also extends outwardly and is shaped to define an egg receiving tray 35. Tray 35 includes an upwardly extending lip 36 and a depression 37 for receiving therein an egg conveyor 38 which extends the length of the egg trough and is shown schematically in FIG. 2 in cage unit 22 and 27, although it is understood that such an egg conveyor is provided for all of the egg trays.

The second section of mesh is larger than the first to allow the hens' heads to protrude therethrough for feeding and/or in the space between the vertically spaced cages to be moe comfortable. The second section includes the top 30 and front walls 33. The first and second sections overlap slightly at rear wall 31 and are secured at this junction by roto-rings.

The ends of the cage assemblies each include an end wall 39 while the individual cages are partitioned by similarly shaped partition walls 40 through 43 as seen in FIG. 1 in cage assembly 21. The end walls 39 and partitioning walls are secured to the wire mesh defining the front, top, rear, and bottom of the cage by means of roto-rings which are commercially available and of conventional design.

Figure 7:
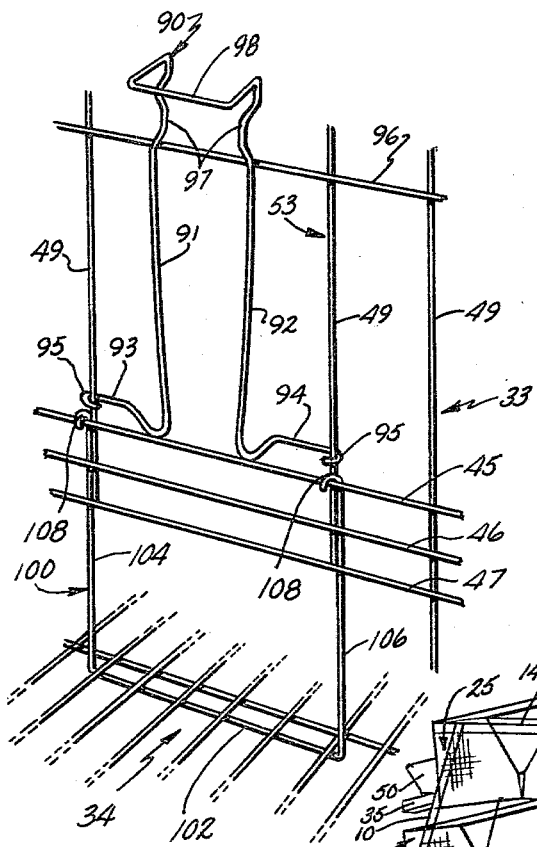
FIG. 7 is an enlarged fragmentary perspective view of the front of one of the cages taken in a direction shown by arrow VII in FIG. 2.

The front wall 33 of the cages includes, as best seen in FIG. 7, three longitudinally extending reinforcing wires 45, 46, and 47 with wire 47 being spaced above cage floor 34 a distance sufficient to allow eggs to easily pass through the gap between this wire and the floor. The mesh of the front wall 33 includes vertically extending wires 49 spaced at approximately equal intervals and horizontally extending wires 96 permitting hens to extend their heads therethrough for access to feeding trays 50 (FIGS. 1 and 2) which are hung on wires 45 through 47 by means of conventional trough hangers at each end together with the improved mounting clips as described in greater detail below.

The feed troughs 50 which are associated with each of the cage units 21 through 28 also include a conveyor 51 which is shown in FIG. 2 schematically on cage units 22 and 27. The conveyor 51 carries a measured and controlled amount of feed to the hens in the cages at a convenient location along the front of each of the cages. Also included in the cage construction but not shown is a conventional watering system by which pipes are mounted to the cages and include watering tubes which extend downwardly and through the partition side walls for each of the cages.

Each of the cage units 21 through 28 are mounted to the end A-frames by means of brackets 60 which are secured to the legs 10 and 12 of the frame such that they are inclined downwardly 6 degrees to the horizontal from back to front thus inclining the floors 34 of the cages such that eggs can roll forwardly and be captured by the egg trays 35. By making the egg trays integral with the wire mesh cage construction, they are slightly resilient and will absorb any impact the egg has against lip 36 thereby eliminating any breakage which might otherwise occur. By inclining the brackets 60, the cages can advantageously utilize a square corner between rear wall 32 and floor 34 thus simplifying the cage construction.

Brackets 60 are mounted to the legs of the frames by a pair of bolts 61 (FIG. 2). As best seen in FIG. 6, the brackets are of angle iron construction fitting under the top wall 30 of the cage and inside the end wall 39. The angle iron bracket 60 includes a downward depending leg 62 and a horizontal leg 64 and integrally includes an L-shaped locking tab 65 near each end. Tabs 65 are stamped from the top leg 64 of the bracket. Tabs 65 thus include an outwardly and horizontally extending leg 66 and a vertically upwardly extending leg 68 which fit between a pair of the vertically extending wires forming the mesh end walls and under the top horizontal wire as seen in FIG. 6. Leg 66 of tab 65 is sufficiently long such that the next assembly identical to that shown in FIG. 1 also can have a partition wall fitted over vertically extending leg 68 thereby lockably securing the assemblies to one another.

In order to add structural rigidity to the assembly, as seen in FIGS. 2 and 3, the uppermost cage assemblies 21 and 25 are proximate and abut on the lower rear corner at the junction of back wall 32 and floor 34. As best seen in FIG. 3, along the length of the cage assembly this junction is coupled by interlocking coupling members 69 comprising in the preferred embodiment roto-rings. Thus, the uppermost tier of cages 21 and 25 provide an additional cross support between legs 10 and 12 and thereby provide significant stability to the structure. With such construction, the cages themselves provide an integral part of the support structure between the legs of the multi-tiered assembly.

In addition, vertical support between the vertically spaced rows of cages is provided with two different structures. In the side including cage assemblies 21 through 24, hangers 70 are provided and spaced approximately one third of the way from each end wall. Each hanger 70 includes an upper hook 72 extending over the rear edge 52 of feeding trough 50 and is supported thereby, a downwardly depending leg 73 and a hook 74 which extends under the upper corner of the next lower cage. Thus, for the embodiment shown in FIG. 1, there are two hangers 70 extending between cage assemblies 21 and 22, two between cage assemblies 22 and 23, and two more between cage assemblies 23 and 24. These hangers serve to support the inwardly and rearwardly extending ends of the cage.

The other method and structure for providing both floor support for the cages and vertical support is shown with respect to cage assemblies 25 through 28. Each of the five cages of each of these rows includes a conventional floor reinforcing wire 75 having generally U-shaped construction with a hook 76 at one end fitted over one of the wires of the mesh defining the rear wall 32, a first downwardly depending leg 77, a forwardly extending floor supporting leg 78 an upper leg 79 and a second hook 80 which extends over one of the wires 45, 46, or 47 (FIG. 7). To the leg support 75 there is provided a hanger 81 having an upper hook 82 fitted over the support wire 75 of an upper cage and having a downwardly extending leg 83 with a hook 85 at the opposite end wrapped around one of the wires forming the inclined rear wall 31 of the cage units. In this embodiment three such hangers 81 are required and are placed approximately in the middle of the cage assembly. In the embodiment shown in FIG. 2, both types of hanger (70 and 81) are employed, it being understood that in a typical installation, one or the other type support hangers will be employed typically independent of the other. Thus, both sides of the cage assembly will either include hangers 70 or hangers 81.

In order to form a door in the front walls of each of the cages, the vertical support wires 49 (FIG. 7) include a double opening 53 defining an access door for insertion and removal of hens. A sliding door 90 is provided for closing the opening when the hens are in the cages. Door 90 is integrally formed of a wire and includes vertically extending legs 91 and 92 terminating in their lower end with outwardly directed legs 93 and 94 having hooks 95 at their ends which surround the vertical wires 49 at the sides of access door 53. Legs 91 and 92 bear against an upper horizontal wire 96 forming a part of the front wall of the cages in a biased relationship achieved by hooks 95 extending behind wires 49 to provide the bias pressure for legs 91 and 92 against wire 96. Legs 91 and 92 extend inwardly to form indents 97 near the top and then outwardly to define a generally U-shaped handle 98 which extends outwardly from the front wall of the cage as best seen in FIG. 2. With the cages inclined as seen in FIG. 2 without handle 98 the operator's hand can bump against the egg tray 35 of the next adjacent cage when opening the door. This is avoided by use of the improved door 90 including the outwardly extending handle 98.

In the embodiment of FIG. 2 in which the hangers 70 are employed, in place of the floor supporting hangers 78, shown on cage assemblies 25 through 28, a U-shaped hanger 100 is employed as shown in FIG. 7. Hanger 100 includes a bottom section 102 extending under several wires defining the floor 34 and upwardly extending legs 104 and 106 terminating in hooks 108 which fit over upper wire 45 of the front wall of the cage. U-shaped hanger 100 thereby supports the floor 34 of each of the cages and eliminates the need for the conventional hangers 78.

Figure 5:
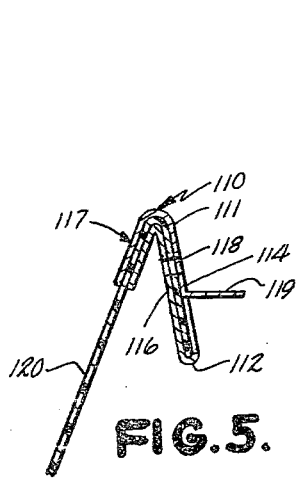
FIG. 5 is a cross-sectional view taken along section lines V—V of FIG. 4.
Figure 4:
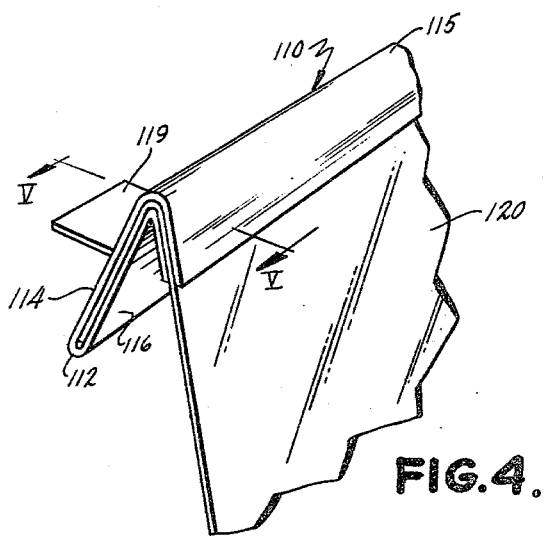
FIG. 4 is a perspective view of a longitudinal support strut and manure shield.

In order to provide longitudinal support for the back of the cage assemblies 21 through 28, longitudinally extending struts 110 (FIGS. 4 and 5) are provided and are configured to include clamping means to serve the dual purpose of compressively holding polyethylene manure screens 120 which extend over the rear inclined surface 31 of each of the cages. Strut 110 is fabricated from 22 gauge galvanized sheet metal extending the full length of the cage assembly which, in the preferred embodiment, is approximately 10 feet. The strut is first folded in half at bend 112 to compressively engage the polyethylene sheet 120 between the legs 114 and 116 so formed. In order to more securely hold the manure sheet 120, another bend is provided at 115 to form a downwardly depending leg 117 to the strut which also provides reinforcing to the strut. A plurality of equally spaced apertures 118 are provided to permit securing of the strut 110 to the screen at the upper rear edge of each of the cages as seen in FIG. 5. When so secured, struts 110 provide significant reinforcing strength to the rear edges of the cages as well as providing the supports for the manure screens. Leg 114 is cut and bent to define an outwardly extending tab 119 at each end which tab overlies surface 64 of the end bracket 60 to provide additional support for the strut to the mounting brackets 60 of the unit. Thus, by reference to FIGS. 4 and 6, tab 119 would fit under the end wire shown in FIG. 6 and identified by reference numeral 30' and the top surface 64 of bracket 60 as well as being secured at equally spaced intervals along its length to the junction of rear inclined wall 31 and top wall 30 of each of the cages.

Figure 8:
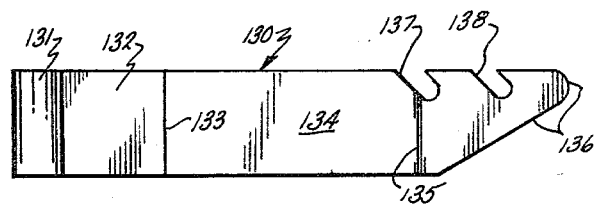
FIG. 8 is a plan view of one of the feed tray holding clamps shown in FIG. 2.

In poultry cages of the present construction, it is essential that the feed trough 50 be secured with its floor 53 essentially horizontal so that the feed conveyor 51 does not wear into the galvanized sheet metal trough. In order to assure this horizontal relationship throughout the length of the unit, each of the partitioned walls between the cages has attached to it a tray holding clamp 130 as seen in FIGS. 2 and 8. Clamp 130 is best shown with reference to cage No. 28 where the left leg 10 is broken away to more clearly show this particular clamp. The clamp comprises a strip of galvanized material formed to have a hook 131 at one end which overlies the lip of the feed trough, a downwardly and inwardly inclined leg 132 which follows the outer surface of the trough and downwardly projecting leg 133 to conform to the trough configuration. The hook includes a rearwardly projecting leg 134 underlying floor 53 of the trough and extends upwardly at a bend 135 and is tapered as best seen in FIG. 8 to a blunt end 136. Along the edge of clamp 130 (facing the partitioning walls between each of the cages when installed) there are formed a pair of notches 137 and 138 spaced from one another a distance corresponding to two adjacent strands of partition screening and inclined toward tip 136 from front to rear. During installation of the clip, lip 131 extends over the upper lip of the trough and the rear leg 134 is forced rearwardly with notches 137 and 138 being forced against the vertically extending partition wires of the cages until the wires snap into notches whereupon the pressure is released and the troughs are held against the face of the wire cages in compression by the clamps 130. The feed troughs 50 are further supported as noted above by conventional galvanized trough clamps which are provided at opposite ends of the trough and which hang on the wires 45, 46, and 47 of the front wall of the cages.

Thus, it is seen that the poultry cage improvements of the present invention provide a variety of features, some of which can be incorporated independently of others although the over all combination is disclosed in the preferred embodiments shown and described herein. It will become apparent to those skilled in the art that various modifications to the improvements described herein in the preferred embodiments of the invention can be made without departing from the spirit or scope of the invention as defined by the appended claims.

The embodiments of the invention in which an exclusive property or privilege is claimed are defined as follows:

1. In a poultry cage assembly comprising a plurality of vertically spaced rows of cages mounted on opposite sides of and extending between a pair of A-frames having upwardly inwardly extending legs, the improvement comprising:

means for mounting at least two rows of cages which each row on an opposite leg to said legs such that a portion of said cages are proximate to one another, wherein said cages are fabricated from wire mesh in a rectilinear shape having front and rear walls, a top, and a bottom with intersecting corners and said proximate location of said rows of cages is at a rear corner of said cages;

means for securing said cages to one another at said proximate location wherein said two rows of cages provide support for the assembly between said legs; and floor support wires extending under said floor and coupled between said front and rear walls of each cage of said assembly, and hanger means having one end coupled to floor support wires of each vertically spaced row of cages and an opposite end coupled to the rear wall of a cage beneath to provide vertical support for the inwardly projecting rear ends of said cages.

2. In a poultry cage assembly comprising a plurality of vertically spaced rows of cages mounted on opposite sides of and extending between a pair of A-frames having upwardly inwardly extending legs, the improvement comprising:

means for mounting at least two rows of cages with each row on an opposite leg to said legs such that a portion of said cages are proximate to one another wherein said cages are fabricated from wire mesh in a rectilinear shape having front and rear walls, a top, and a bottom with intersecting corners and said proximate location of said rows of cages is at a rear corner of said cages;

means for securing said cages to one another at said proximate location wherein said two rows of cages provide support for the assembly between said legs; and feeding troughs mounted to and extending along the front of each row of cages and further including hanger means extending between vertically spaced rows of cages said hanger means having an upper end secured to a feeding trough and a lower end secured to the top of a cage directly below to provide vertical support for the inwardly projecting rear ends of said cages.

3. A poultry cage assembly comprising a plurality of rows of wire mesh cages mounted on opposite sides of and extending between a pair of end frames in vertically spaced relationship, each row of cages including front sides facing in a direction away from said end frames and rear sides facing in a direction inwardly of said end frames with top and bottom sides extending therebetween; said vertically spaced rows of cages tiered to extend inwardly of said end frames such that the vertically spaced rows vertically overlap one another; a longitudinal strut extending along each upper rear corner of said cages formed at the juncture of said top side and rear side of each of said cages; said strut being secured to said cages at said corner to provide reinforcement and support thereto, each said strut integrally including clamping means for compressively gripping one edge of a manure screen which drapes over the said rear sides.

4. The apparatus as defined in claim 3 wherein said manure screen comprises a sheet of material extending downwardly from said strut and over the rear of said row of cages.

5. A poultry cage assembly comprising rows of wire mesh cages mounted on opposite sides of and extending between a pair of end frames in vertically spaced relationship, a plurality of vertically spaced rows of cages tiered to extend inwardly on said end frames such that the vertically spaced rows vertically overlap one another including a longitudinal strut extending along an upper rear corner of said cages and secured to said cages to provide support thereto, said strut integrally including clamping means for compressively gripping one edge of a manure screen, said manure screen comprises a sheet of material extending downwardly from said strut and over the rear of said row of cages, brackets for mounting said rows of cages to said end frames, and each said strut including integrally formed tab means which engage and are supported by said brackets.

6. The apparatus as defined in claim 5 wherein said strut includes a plurality of apertures formed therein at spaced intervals along its length and wherein said strut is secured to said cages by fasteners passing through said apertures.

7. In a poultry cage assembly comprising a plurality of vertically spaced rows of wire mesh cages mounted on opposite sides of and extending between a pair of A-frames having upwardly inwardly extending legs, the improvement comprising:

bracket means for each row of cages at each end of said assembly said bracket means secured to the legs of said A-frames for mounting said rows of cages in horizontally off-set relationship to rows of cages on the same leg of the A-frames and to incline the floors of said cages downwardly from rear to front, wherein said bracket means integrally includes outwardly and upwardly extending tabs over which an end wire of each of said rows of wire mesh cages is captively held and which is adapted to captively hold an end wire of an adjacent poultry cage assembly to lock cage assemblies together and wherein at least two rows of said rows of cages are proximate to one another and wherein said two rows of cages are secured to one another at said proximate location to provide support for the assembly between said legs.

8. In a poultry cage assembly comprising a plurality of vertically spaced rows of wire mesh cages mounted on opposite sides of and extending between a pair of A-frames having upwardly inwardly extending legs, the improvement comprising:

bracket means for each row of cages at each end of said assembly said bracket means secured to the legs of said A-frames for mounting said rows of cages in horizontally off-set relationship to rows of cages on the same leg of the A-frames and to incline the floors of said cages downwardly from rear to front, wherein said bracket means integrally includes outwardly and upwardly extending tabs over which an end wire of each of said rows of wire mesh cages is captively held and which is adapted to captively hold an end wire of an adjacent poultry cage assembly to lock cage assemblies together, wherein at least two rows of said rows of cages are proximate to one another and wherein said two rows of cages are secured to one another at said proximate location to provide support for the assembly between said legs; and floor support wires extending under said floor and coupled between the front and rear walls of each cage of said assembly, and hanger means having one end coupled to floor support wires of each vertically spaced row of cages and an opposite end coupled to the rear wall of a cage beneath to provide vertical support for the inwardly projecting rear ends of said cages.

9. In a poultry cage assembly comprising a plurality of vertically spaced rows of wire mesh cages mounted on opposite sides of and extending between a pair of A-frames having upwardly extending legs, the improvement comprising:

bracket means for each row of cages at each end of said assembly said bracket means secured to the legs of said A-frames for mounting said rows of cages in horizontally off-set relationship to rows of cages on the same leg of the A-frames and to incline the floors of said cages downwardly from rear to front, wherein said bracket means integrally includes outwardly and upwardly extending tabs over which an end wire of each of said rows of wire mesh cages is captively held and which is adapted to captively hold an end wire of an adjacent poultry cage assembly to lock cage assemblies together, wherein at least two rows of said rows of cages are proximate to one another and wherein said two rows of cages are secured to one another at said proximate location to provide support for the assembly between said legs; and feeding troughs mounted to and extending along the front of each row of cages and further including hanger means extending between vertically spaced rows of cages said hanger means having an upper end secured to a feeding trough and a lower end secured to the top of a cage directly below to provide vertical support for the inwardly projecting rear ends of said cages.

10. For use in a poultry cage assembly comprising rows of wire mesh cages mounted on opposite sides of and extending between a pair of end frames in vertically spaced relationship, wherein said cages include a front wall and partition walls defining a plurality of separate cages in each row; a generally U-shaped feed trough extending longitudinally along said front wall of each of said row of cages said trough having a floor, one leg adjacent the front wall of said row of cages, an outer wall and bracket means comprising:

a bracket circumscribing said outer wall of said trough and extending under said floor and into said cages adjacent said partition walls, said bracket including first hook means for securing one end of said bracket remote from said trough to said partition walls for compressively holding said trough against said front wall of said row of cages.

11. The apparatus as defined in claim 10 wherein said bracket includes second hook means at the other end for engaging the outer wall of the trough.

12. The apparatus as defined in claim 11 wherein said one end of said bracket is tapered to terminate in a blunt end.

13. The apparatus as defined in claim 12 wherein a plurality of brackets are provided for the assembly one positioned at each partition wall along each trough of the assembly.

14. A poultry cage assembly comprising:

a plurality of vertically spaced rows of wire mesh cages each having a floor, a rear, a top, a front and partitions dividing the rows into separate cages;

a pair of spaced A-frames having upwardly inwardly extending legs;

means for mounting said rows of cages on said legs of and extending between said A-frames such that the junction of the floor and rear of the uppermost rows of cages contact one another;

means for securing said uppermost rows of cages to one another at said junction to provide support for the assembly between said legs; and a plurality of hangers coupled between vertically spaced rows of cages of each side of said A-frame to provide vertical support for the rear portion of said cages.

* * * * *

UNITED STATES PATENT AND TRADEMARK OFFICE
CERTIFICATE OF CORRECTION

PATENT NO. : 4,212,269
DATED : July 15, 1980
INVENTOR(S) : Charles A. White et al.

It is certified that error appears in the above—identified patent and that said Letters Patent is hereby corrected as shown below:

Column 3, line 2, "moe" should read -- more --.

Column 8, line 44, claim 9, after "upwardly" insert -- inwardly --.

Signed and Sealed this

Thirteenth Day of January 1981

[SEAL]

Attest:

SIDNEY A. DIAMOND

Attesting Officer

Commissioner of Patents and Trademarks